(12) United States Patent
Lindley et al.

(10) Patent No.: US 8,714,619 B2
(45) Date of Patent: May 6, 2014

(54) VEHICLE SEAT

(75) Inventors: Miles Lindley, Odenthal (DE); Joerg Tabellion, Odenthal (DE); Ponnarasu Annal Ganesan, Leverkusen (DE); Michael Fahl, Overath (DE); Raghu Balla, Leverkusen (DE)

(73) Assignee: Johnson Controls GmbH, Burscheld (DE)

(*) Notice: Subject to any disclaimer, the term of this patent is extended or adjusted under 35 U.S.C. 154(b) by 281 days.

(21) Appl. No.: 12/528,583

(22) PCT Filed: Feb. 22, 2008

(86) PCT No.: PCT/EP2008/001425
§ 371 (c)(1),
(2), (4) Date: Nov. 15, 2010

(87) PCT Pub. No.: WO2008/104333
PCT Pub. Date: Sep. 4, 2008

(65) Prior Publication Data
US 2011/0062738 A1    Mar. 17, 2011

(30) Foreign Application Priority Data

Feb. 26, 2007  (DE) .......................... 10 2007 009 622
Mar. 16, 2007  (DE) .......................... 10 2007 013 376
Nov. 9, 2007   (DE) .......................... 10 2007 053 958

(51) Int. Cl.
*B60N 2/30* (2006.01)
(52) U.S. Cl.
CPC .................................. *B60N 2/3011* (2013.01)
USPC ...................... 296/65.09; 297/236; 297/378.1
(58) Field of Classification Search
USPC .......... 296/65.01, 65.03, 65.05, 65.09, 65.11, 296/65.16; 297/234, 235, 236, 239, 248, 297/257, 314, 325, 331, 340, 378.1
See application file for complete search history.

(56) References Cited

U.S. PATENT DOCUMENTS

| 808,679 A * | 1/1906 | Pickles .......................... 297/236 |
| 6,840,577 B2 * | 1/2005 | Watkins ..................... 297/284.9 |
| 2005/0052044 A1 * | 3/2005 | Toyota et al. ............... 296/24.34 |

FOREIGN PATENT DOCUMENTS

| CN | 1530255 A | 9/2004 |
| DE | 19811958 A1 | 9/1999 |
| DE | 102004017655 A1 | 1/2005 |
| DE | 10392187 T5 | 2/2005 |
| DE | 102007005144 A1 | 8/2008 |
| EP | 0769410 A2 | 4/1997 |
| EP | 1075983 A | 2/2001 |
| EP | 1449710 A2 | 8/2004 |
| EP | 1529681 A1 | 5/2005 |

(Continued)

OTHER PUBLICATIONS

Machine translation (Japanese to English) of previously cited Japanese Reference (JP 2001-130304), retreived from the JPO wesite on Oct. 22, 2012.*
Machine translation (French to English) of newly cited European Reference (EP 1,632,389), retreived from the EPO website on Oct. 22, 2012.*

(Continued)

*Primary Examiner* — Glenn Dayoan
*Assistant Examiner* — Jason S Daniels
(74) *Attorney, Agent, or Firm* — Butzel Long

(57) ABSTRACT

The invention relates to a vehicle seat (1) comprising at least one first segment (3, 3') with a seat part (6) as well as a second segment (2) with a seat part (5) and a backrest (4). The second segment can be stowed underneath the seat part (6) while the backrest (4) is collapsible.

14 Claims, 5 Drawing Sheets

(56) References Cited

FOREIGN PATENT DOCUMENTS

| | | |
|---|---|---|
| EP | 1632389 A2 * | 3/2006 |
| GB | 2323526 A | 9/1998 |
| JP | 09002113 A | 1/1997 |
| JP | 2001130304 A | 5/2001 |
| JP | 2002225603 A | 8/2002 |
| WO | 2005077708 A2 | 8/2005 |
| WO | WO2008104333 A1 | 8/2008 |

OTHER PUBLICATIONS

Patent Treaty Cooperation, International Publication with International Search Report, WO2008/104333, Sep. 4, 2008.

Patent Treaty Cooperation, International Preliminary Report on Patentability, PCT/EP2008/001425, Sep. 8, 2009.

Patent Treaty Cooperation, Written Opinion of the International Search Authority, PCT/EP2008/001425, (German and English Translation).

* cited by examiner

VEHICLE SEAT

CROSS REFERENCE TO RELATED APPLICATIONS

The present application is a U.S. National Stage filing of International Application No. PCT/EP2008/001425, filed on Feb. 22, 2008, titled "VEHICLE SEAT" which claims priority to German Patent Application No. DE 10 2007 009 622.6, filed Feb. 26, 2007; German Patent Application No. DE 10 2007 013 376.8, filed Mar. 16, 2007; and German Patent Application No. DE 10 2007 053 958.6, filed Nov. 9, 2007, the entire disclosures of which are incorporated herein by reference.

BACKGROUND

The disclosure generally relates to a vehicle seat having at least one first seat segment and second seat segment, such as a rear seat bench for a motor vehicle. More particularly, the disclosure relates in particular to a vehicle seat having a central seat segment and two lateral seat segments.

Such vehicle seats are known, for example, from WO 2005/077708 A2, published Aug. 25, 2005, to Souville et al.; DE 103 92 187 T5, published Feb. 24, 2005, to Wiedman et al.; and DE 10 2004 017 655 A1, published Jan. 5, 2005, to Eichhorn et al. The publications EP 1 449 710 A2, published Aug. 25, 2004, to Shibata et al.; EP 0 769 410 A2, published Apr. 23, 1997, to Hashimoto et al.; JP 09002113, published Jan. 7, 1997, to Otani; and JP 2001130304 A, published May 15, 2001, to Tono et al. represent further prior art. The vehicle seats disclosed therein, however, are relatively costly to manufacture and require a relatively large amount of space for the respective pivoting movement. Moreover, the central seats often do not satisfy the relevant safety regulations and/or they have a relatively low level of comfort.

SUMMARY

In one exemplary embodiment, there is disclosed a vehicle seat comprising at least one first segment with a seat part and a second segment with a seat part as well as a backrest, the second segment being able to be stowed underneath the seat part of the first segment and the backrest being designed to be collapsible.

The seat bench of the disclosed exemplary embodiment has a first segment which is located adjacent to a second segment. Preferably, two first seat segments are present which are located to the right and left, adjacent to the second segment. The segments preferably form a seat bench to be located in a motor vehicle, in particular, as a rear seat bench which is preferably arranged transversely to the direction of travel of the motor vehicle. Accordingly, the second segment is preferably the central segment of a three-seat bench. Moreover, according to the disclosed exemplary embodiment a second seat segment may be stowed below the seat part of a first seat segment and that the backrest of the second seat segment is designed to be collapsible.

The vehicle seat according to one disclosed exemplary embodiment is able to be produced more easily and more cost-effectively. The lateral pivoting movement of the seat does not require any additional space between the vehicle seat according to the one exemplary embodiment and seats arranged in front of the vehicle seat. As the backrest of the second seat segment includes a collapsing mechanism and is designed to be collapsible, the second seat segment requires relatively little stowage space, although in the state of use (i.e., use position) the vehicle seat satisfies all the required safety requirements and provides a relatively high level of comfort.

Collapsible or collapsing within the meaning of the disclosure means that the backrest of the second seat segment in at least one dimension, in particular in the longitudinal dimension, may be reduced, in a reversible manner. Preferably, the backrest can be reduced in its length such that, once reduced, the reduced length of the backrest is shorter than the length of the seat part of the first seat segment. In on alternative exemplary embodiment, the same collapsible or collapsing applies to the width dimension of the backrest, provided the width is also designed to be collapsible.

In one exemplary embodiment, tha collapsing of the backrest takes place during, or in another alternative before, the stowage of the second seat segment. In particular, the collapsing of the backrest preferably takes place when rotating the backrest from a substantially vertical position of use into a substantially vertical stowage position, in which the backrest is located parallel to the seat part.

Preferably, the collapsing takes place by pushing together the bearing structure of the backrest, particularly preferably according to the rotational movement of the backrest from the position of use into a stowage position. In one exemplary embodiment, that collapsing of the backrest takes place, for example, by a gear unit which is operatively connected, in particular, to the bearing structure, for example a telescopic tube. The collapsing of the backrest may also take place by any other appropriate structure and/or means, for example hydraulically, pneumatically, electrically, by a worm gear or the like. During the collapsing, a spring may be tensioned which facilitates the subsequent unfolding of the backrest when it is moved again from the stowage position back toward and then into the position of use.

Preferably, the backrest has a region which may be extended, similarly to the manner of a bellows, which particularly preferably bears against the lower part of the backrest cushion and substantially covers the gap to the seat part for allowing collapsing of the backrest. The bearing structure of the backrest is driven, for example, as disclosed above. In one exemplary embodiment, that bellows-like region preferably consists of a part of the seat cover protruding over the backrest cushion, which is provided with correspondingly extending seams or reinforcements for forming pre-determined folding points.

It may further preferably be provided that the contour of the backrest, when folded onto the seat part, is flattened in a reversible manner, to reduce the height of the second seat segment before stowage.

Preferably, the second seat segment has a backrest, which may be particularly preferably folded onto the seat part.

In another exemplary embodiment, the first segment preferably has a seat part which may be pivoted such that a stowage space located thereunder is opened up, into which the second seat segment may be pivoted. To this end, the seat part is preferably folded into a substantially vertical position. Preferably, the seat part is pivotable through about ninety degrees (90°) from a substantially horizontal position into a substantially vertical position.

In one exemplary embodiment, the folding of the backrest of the second seat segment and the pivoting of the seat part of the first segment preferably take place substantially at the same time.

Preferably, the seat part and the backrest of the second seat segment are pivotably arranged in the stowage space under the seat part of the first seat segment. To this end a rotating mechanism or a rotating means is arranged on the seat part of the first seat segment, in particular a pivot pin or a rotating joint, which is preferably located between the seat parts of the first and second seat segments. Even when two first seat segments are arranged to the right and left of the second central seat segment, the second seat segment is preferably pivotably connected to only one first seat segment. In this exemplary embodiment the vehicle seat includes the advantage that a first seat segment released from the other seat segments is able to be removed from the vehicle or is able to be altered in its position inside the vehicle.

In one exemplary embodiment, a locking connection is preferably present between a second seat segment and a first seat segment and is preferably released when folding forward the seat part of the other first seat segment. This connection exists particularly preferably between the second seat segment and the first seat segment which is not pivotably connected to the second seat segment. The connection preferably serves for reinforcing the entire vehicle seat.

In one exemplary embodiment, the first seat segment, in particular the first seat segment under which the first seat segment is stowed, is preferably arranged in a height-adjustable manner. This embodiment has the advantage that more stowage space may be made available for the second seat segment.

In one exemplary embodiment, there is disclosed a method for stowing a seat segment under another seat segment arranged to the side, including the steps of:
a folding a backrest of the second seat segment onto a seat part of the second seat segment,
b collapsing the backrest,
c folding a seat part of a first seat segment to open up a stowage space under the seat part of the first seat segment, and
d pivoting the seat part and the backrest of the second seat segment to the side into the stowage space.

The exemplary embodiments disclosed for the vehicle seat apply equally to the method of stowing according to the disclosure.

In alternative exemplary embodiments, the method steps a and b may take place substantially at the same time or in any sequence.

Preferably, when folding forward the backrest of the second segment, a locking connection between the first segment and the second segment is released. This method step is preferably carried out when two first segments are present, one being located to the right and one being located to the left of the second segment. The connection to one of these two first segments is then released.

Preferably, the first seat segment is adjustable in its height whereby the stowage space located thereunder may be increased. In one alternate exemplary embodiment, the second seat segment may be stowed in this stowage space.

In one alternate exemplary embodiment, the backrest of the second segment is designed to be collapsible. As a result, the backrest may be reduced in its length, so that it requires less stowage space.

The disclosed exemplary embodiments are described hereinafter with reference to FIGS. 1-5. These explanations are provided merely by way of example and do not limit the general inventive idea. The explanations apply equally to all subjects of the invention.

DETAILED DESCRIPTION

Figure 1A:
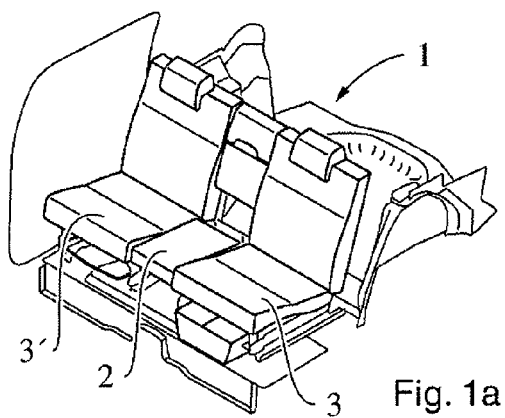
FIGS. 1a through 1f show the stowage of the first seat segment.
Figure 1B:
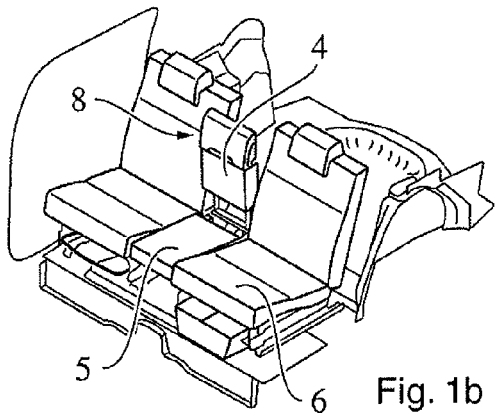
Figure 1C:
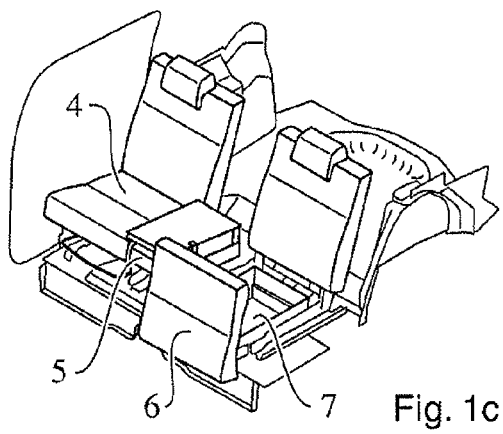
Figure 1D:
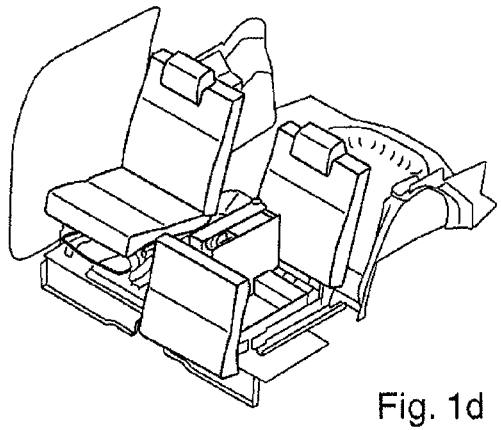
Figure 1E:
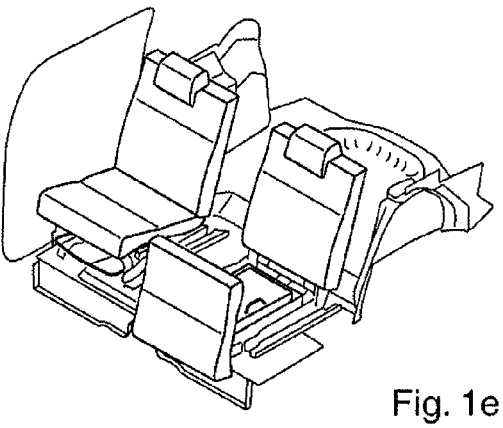
Figure 1F:
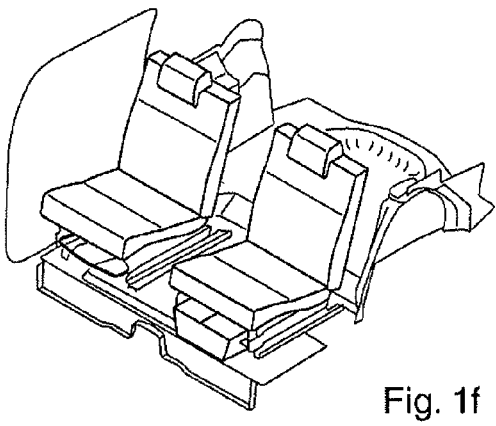
Figure 2A:
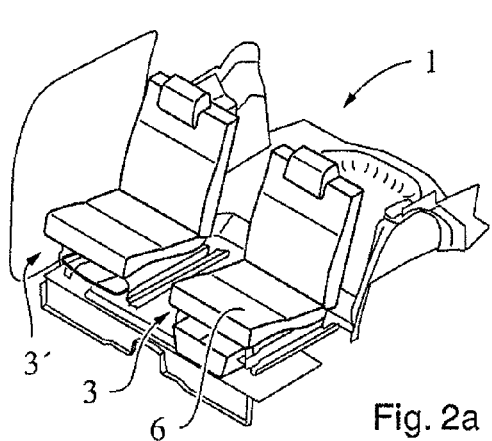
FIGS. 2a through 2f show the folding out of the first seat segment.
Figure 2B:
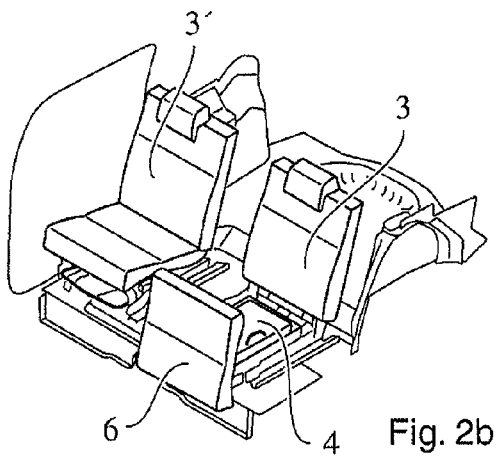
Figure 2C:
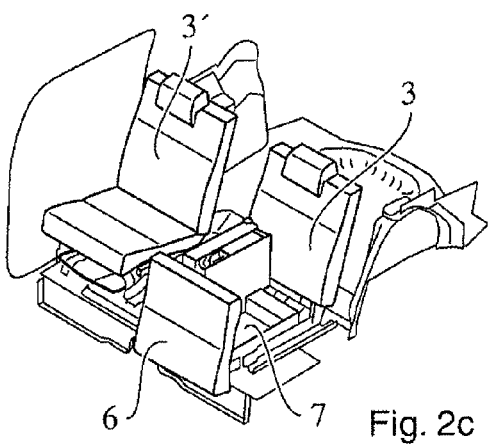
Figure 2D:
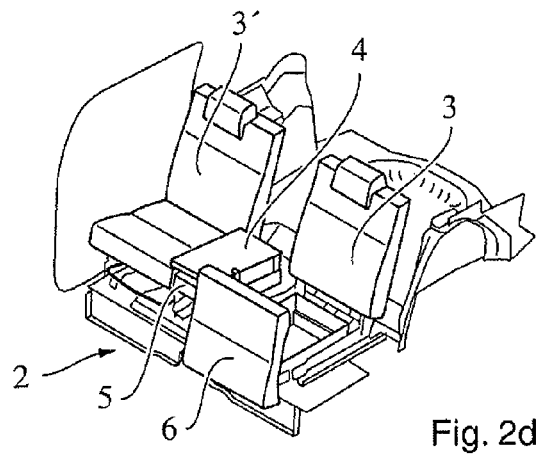
Figure 2E:
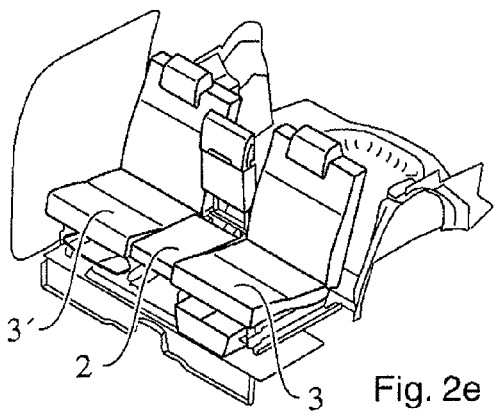
Figure 2F:
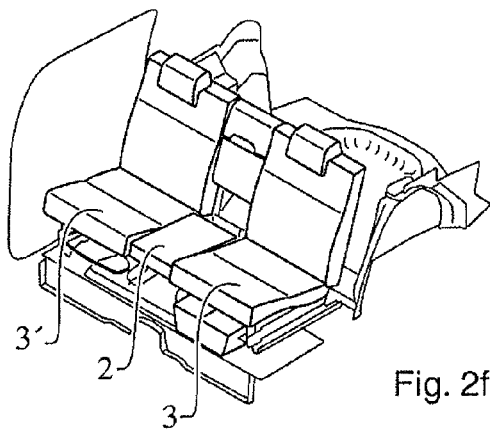

A rear seat bench 1 is shown in FIG. 1a in the position of use, the rear seat bench includes a central second seat segment 2 and two lateral first seat segments 3, 3'. The backrest 4 of the central seat segment 2 is, as visible from FIGS. 1b and 1c, able to be folded by approximately 90° from the use position toward the front onto the corresponding seat part 5 into a horizontal position. The seat part 6 of the seat segment 3 is also foldable by about ninety degrees (90°) toward the front into a vertical position and opens up a stowage space 7 (FIG. 1d) located below the seat part 6. The central seat segment 2 may now be pivoted to the side into this stowage space 7. After folding back the seat part 6 (FIG. 1f) the lateral seat segment 3 is again in the position of use. The gaps produced between the lateral seat segments 3, 3' may, for example, be used for climbing through or for transporting goods to be loaded which are of long length. The displacement into (return to) the initial position takes place correspondingly in the reverse sequence (FIGS. 2a to 2f).

The central seat segment 2 is preferably directly fastened in an articulated manner to the lateral seat segment 3, so that the other lateral seat segment 3' may be independently therefrom removed from the vehicle. The unlocking of the pivot pins from the backrest 4 and the unit made up of the backrest 4 and seat part 5 preferably takes place by folding forward the seat part 6 of the lateral seat segment 3.

Figure 3A:
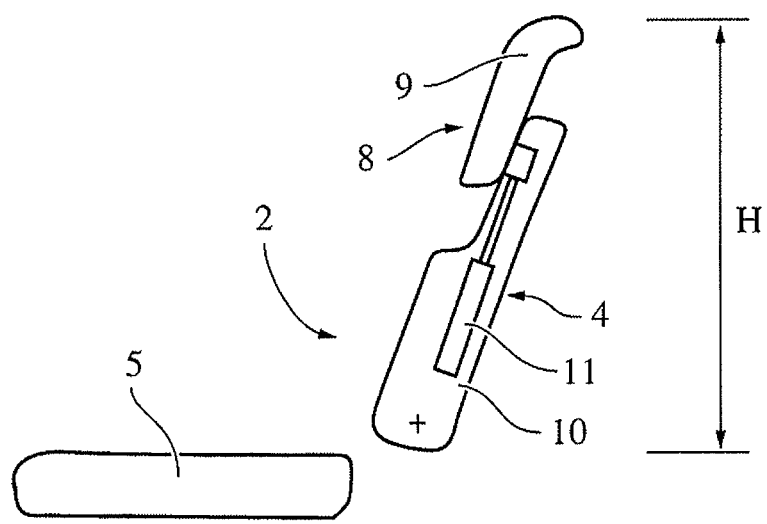
FIGS. 3a and 3b show an exemplary embodiment of the collapsible backrest.
Figure 3B:
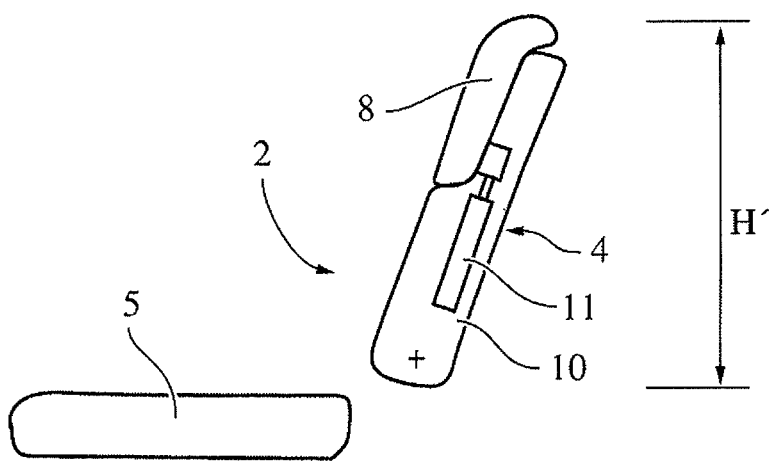

To reduce the size of the seat unit to be stowed, the backrest 4 of the central seat part is designed to be collapsible, and may therefore be reduced in any of its lengths including in its height H (viewed in the position of use) to a reduced length or height H'. To this end, (see FIG. 3a) the upper part 8 of the backrest 4, which also forms the headrest 9 of the central seat segment 2, is displaceable before or during the folding onto the seat part 5 manually in the direction of the lower part 10 of the backrest 4 (FIG. 3b). In the embodiment, a telescopic tube 11 is used for guidance, but alternatively the use of a rail system is also conceivable.

Figure 4A:
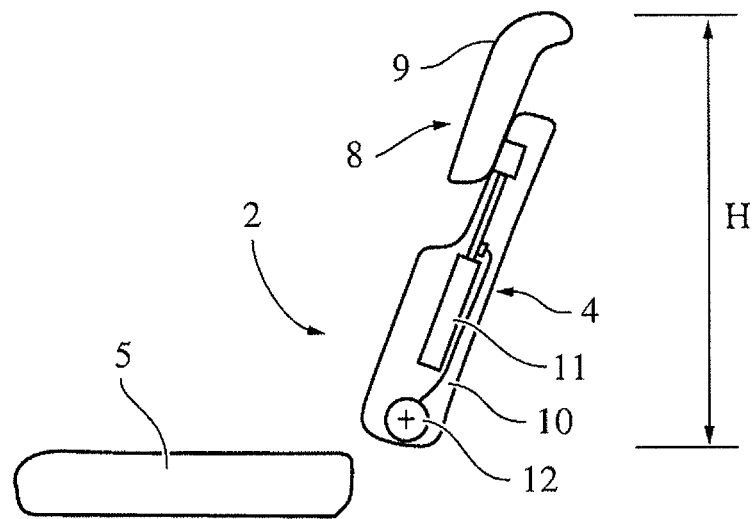
FIGS. 4a and 4b show a further exemplary embodiment of the collapsible backrest.
Figure 4B:
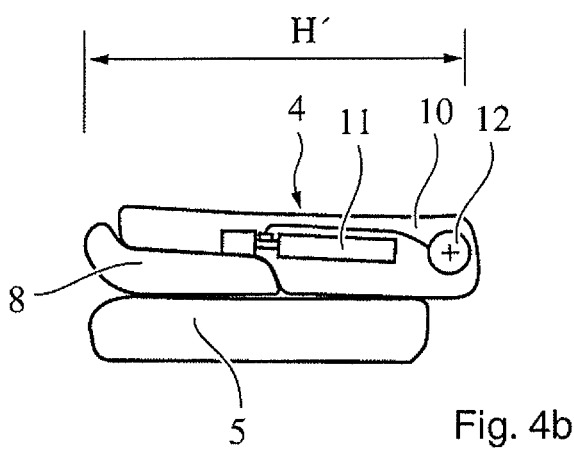

In the exemplary embodiment disclosed in FIGS. 4a, 4b, the pushing together from the height H to the height H' is carried out according to the rotational movement of the backrest 4 by a gear unit 12 which is operatively connected to the telescopic tube 11. The collapse of the backrest 4 may also take place by any other mechanism or means, for example hydraulically, pneumatically, electrically, by a worm gear or the like.

Figure 5A:
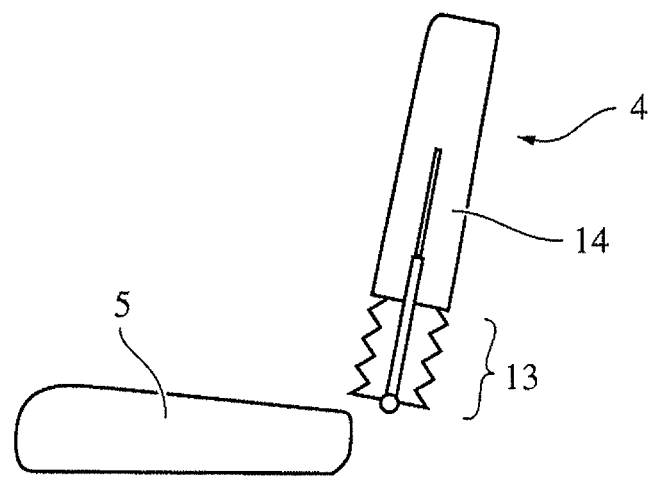
FIGS. 5a and 5b show a further exemplary embodiment of the collapsible backrest.
Figure 5B:
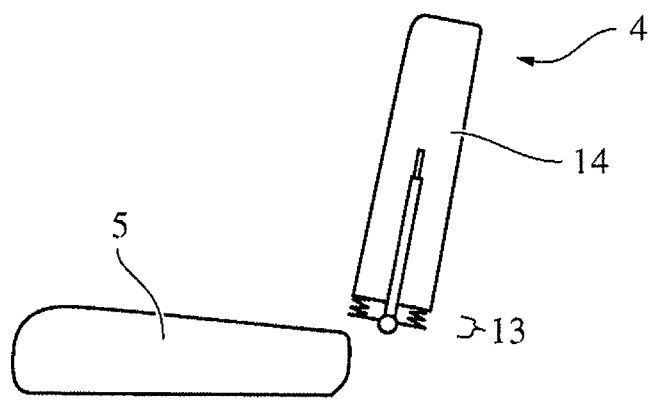

In the exemplary embodiment disclosed in FIG. 5, the backrest is configured to be collapsible by means of a region 13 which may be extended in the manner of a bellows, which bears against the lower part of the backrest cushion 14 and substantially conceals the gap in the seat part 5. The backrest cushion 14 is preferably driven by using the mechanisms and/or means disclosed in FIGS. 3 and 4 intended for displacing the upper backrest part 8.

The bellows-like region 13 preferably includes a part of the seat cover protruding over the backrest cushion 14, which is provided with correspondingly extending seams or reinforcements 10 for forming pre-determined folding points.

The invention claimed is:

1. A vehicle seat comprising:
   two first seat segments each having a seat part, wherein each first segment seat part has an inboard edge and an outboard edge; and
   a second seat segment having a seat part and a backrest, wherein the second seat segment is positioned adjacent inboard edges of the two first seat segments and the backrest is foldable onto the second seat segment seat part and the second seat segment is stowable underneath a first one of the two first seat segment seat parts in a stowage space, and the backrest is collapsible in at least one of its width and height lengths to fit in the stowage space; and
   a lockable connection between a second one of the two first seat segments and the second seat segment, the lockable connection being unlocked when folding forward the seat part of the first one of the two first seat segments.

2. The vehicle seat of claim 1, wherein folding forward of the seat part of the first one of the two first seat segments unlocks the backrest, and the backrest is foldable onto the second seat segment seat part.

3. The vehicle seat of claim 1, wherein the collapsing of the backrest takes place as the backrest is folded onto the second seat segment seat part.

4. The vehicle seat of claim 1 wherein said stowage space is located below the seat part of the first one of the two first seat segments and the seat part of the first one of the two first seat segments is movable to a substantially vertical position such that the stowage space is accessible.

5. The vehicle seat of claim 1 wherein the folding of the backrest and of the seat part of the first one of the two first seat segments takes place substantially at the same time.

6. The vehicle seat of claim 4 wherein the second seat segment seat part and the backrest are pivotably arranged in the stowage space.

7. A vehicle seat comprising:
   two first seat segments, each having a seat part, wherein each first segment seat part has an inboard edge and an outboard edge;
   a second seat segment having a seat part and a backrest, wherein the second seat segment is positioned adjacent inboard edges of the two first seat segments and the backrest is foldable onto the second seat segment seat part and the second seat segment pivots about the inboard edge of a first one of the two first segment seat parts and is stowable underneath the first one of the two seat segment seat parts, and the backrest is collapsible in at least one of its width and height lengths; and
   a lockable connection between a second one of the two first seat segments and the second seat segment, the lockable connection being unlocked when folding forward the backrest of the second seat segment toward the seat part of the second seat segment.

8. The vehicle seat of claim 1 wherein the first seat segments are height-adjustable.

9. A method for stowing a second seat segment under a first one of two first seat segments arranged on opposite sides of the second seat segment, said method comprising the steps of:
   a. folding a backrest corresponding to the second seat segment onto a second seat part of the second seat segment,
   b. collapsing the backrest as it is folded onto the second seat part,
   c. folding a first seat part of the first one of the two first seat segments upwardly to provide access to a stowage space located under the first seat part of the first one of the two first seat segments,
   d. unlocking a lockable connection between a second one of the two first seat segment and the second seat segment when the backrest is folded forward; and
   e. pivoting the second seat part of the second seat segment and the collapsed backrest into the stowage space.

10. The method of claim 9 further comprising the step of adjusting a height of one of the first seat segments prior to collapsing the backrest.

11. A bench seat for a vehicle, the bench seat comprising:
    two first seat segments, each having a seat part, wherein the first seat segment seat parts each have an inboard edge and an outboard edge;
    a second seat segment positioned adjacent the inboard edges of the first seat segment seat parts, and the second seat segment is movable between a use position and a stow position underneath a first one of the first seat segment seat parts, wherein the second seat segment includes a seat part and a backrest aligned with the first one of the first seat segment, and folding forward of the first seat segment seat part of the first one of the first seat segments unlocks the backrest, and the backrest is collapsible in at least one of its width and height lengths when it is folded on the second seat segment seat part to be stowed in a stowage space underneath the first seat segment seat part; and
    a lockable connection between a second one of the two first seat segments and the second seat segment, the lockable connection being unlocked when folding forward the seat part of the first one of the two first seat segments or when folding forward the backrest of the second seat segment toward the seat part of the second seat segment.

12. The vehicle bench seat of claim 11 wherein said stowage space is located below the first one of the two first seat segment seat parts and the first one of the two first seat segment seat parts is movable to a substantially vertical position such that the stowage space is accessible.

13. The vehicle bench seat of claim 11 wherein the folding of the backrest and of the first one of the two seat segment seat parts takes place substantially at the same time.

14. The method of claim 9, wherein steps a and b take place substantially at the same time.

* * * * *